(12) United States Patent
Tawfik

(10) Patent No.: US 10,193,176 B2
(45) Date of Patent: Jan. 29, 2019

(54) SYSTEM AND METHOD FOR PRODUCTION OF ULTRA-PURE HYDROGEN FROM BIOMASS

(71) Applicant: The Research Foundation for SUNY, Albany, NY (US)

(72) Inventor: Hazem Tawfik, Islip Terrace, NY (US)

(73) Assignee: The Research Foundation for SUNY, Albany, NY (US)

(*) Notice: Subject to any disclaimer, the term of this patent is extended or adjusted under 35 U.S.C. 154(b) by 193 days.

(21) Appl. No.: 15/143,577

(22) Filed: Apr. 30, 2016

(65) Prior Publication Data
US 2017/0312718 A1 Nov. 2, 2017

(51) Int. Cl.
| | |
|---|---|
| *H01M 8/06* | (2016.01) |
| *H01M 8/0612* | (2016.01) |
| *C01B 3/56* | (2006.01) |
| *C01B 3/16* | (2006.01) |
| *C01B 3/52* | (2006.01) |
| *C10J 3/84* | (2006.01) |
| *C01B 3/50* | (2006.01) |

(52) U.S. Cl.
CPC ............ *H01M 8/0618* (2013.01); *C01B 3/16* (2013.01); *C01B 3/501* (2013.01); *C01B 3/52* (2013.01); *C01B 3/56* (2013.01); *C10J 3/84* (2013.01); *B01J 2219/00745* (2013.01); *B01J 2219/00759* (2013.01); *C01B 2203/0283* (2013.01); *C01B 2203/0288* (2013.01); *C01B 2203/042* (2013.01); *C01B 2203/0405* (2013.01); *C01B 2203/0415* (2013.01); *C01B 2203/066* (2013.01); *C01B 2203/1076* (2013.01); *C10J 2300/0916* (2013.01)

(58) Field of Classification Search
None
See application file for complete search history.

(56) References Cited

U.S. PATENT DOCUMENTS

| | | | | |
|---|---|---|---|---|
| 4,052,176 A | * | 10/1977 | Child ................ | B01D 53/1406 252/373 |
| 4,464,349 A | * | 8/1984 | Onley .................. | B01D 53/62 252/189 |
| 6,627,572 B1 | * | 9/2003 | Cai ....................... | B01J 23/80 502/307 |

(Continued)

*Primary Examiner* — Wyatt P McConnell
(74) *Attorney, Agent, or Firm* — Steven A. Wood; Ashley Panek

(57) ABSTRACT

The disclosure provides a system and method for synthesizing ultra-pure hydrogen from biomass waste. The present invention comprises a gasifier, an oils and tars filter, a steam generator, a water gas shift reactor ("WGS"), a heat-exchange two-phase water separator, a scrubber, a hydrogen separator, and fluid conduits in fluid communication with the various system components, which together convert hydrocarbon-based biomass, e.g., woodchips, into ultra-pure hydrogen gas. Fluid conduits connect the gasifier and the steam generator, separately, to the WGS, the WGS to the two-phase separator, the two-phase separator to the scrubber, and the scrubber to the hydrogen separator, which further comprises an outlet port through which hydrogen gas may flow free of carbon monoxide. The hydrogen may flow to a device that utilizes hydrogen to generate energy, such as a hydrogen fuel cell or to an internal combustion engine.

15 Claims, 10 Drawing Sheets

(56) References Cited

U.S. PATENT DOCUMENTS

| | | | | |
|---|---|---|---|---|
| 7,691,182 B1* | 4/2010 | Muradov | ............... | B01D 53/75 |
| | | | | 422/169 |
| 2006/0177372 A1* | 8/2006 | Doshi | ..................... | C01B 3/384 |
| | | | | 423/652 |
| 2007/0122667 A1* | 5/2007 | Kelley | ................... | C01B 3/382 |
| | | | | 429/411 |
| 2007/0129450 A1* | 6/2007 | Barnicki | .................. | C10G 2/30 |
| | | | | 518/704 |
| 2010/0243475 A1* | 9/2010 | Eisman | ............... | B01D 53/226 |
| | | | | 205/763 |
| 2010/0275514 A1* | 11/2010 | Paganessi | .................. | C10J 3/20 |
| | | | | 48/86 R |
| 2013/0118735 A1* | 5/2013 | Jamal | .................. | H01M 8/0675 |
| | | | | 166/266 |

\* cited by examiner

SYSTEM AND METHOD FOR PRODUCTION OF ULTRA-PURE HYDROGEN FROM BIOMASS

GOVERNMENT RIGHTS STATEMENT

The invention disclosed herein was made at least in part with funding by the U.S. Government, specifically the United States Department of Energy under grant number DE-EE0003228. Therefore, the U.S. Government has certain rights in this invention.

RELATED APPLICATIONS

This application claims priority to U.S. Provisional Application No. 62/155,800, filed May 1, 2015 and entitled PRODUCTION OF ULTRA-PURE HYDROGEN FROM BIOMASS WASTE TO ENERGIZE PROTON EXCHANGE MEMBRANE (PEM) AND PRODUCE USEFUL COMBINED HEAT AND ELECTRIC POWER (CHEP).

FIELD

The present disclosure relates to a hydrogen purification method and system and, more particularly, to a method and system for hydrogen purification from biomass fuel.

BACKGROUND

Recent concern over the state of the environment, the dangers of high levels of greenhouse gas emissions and global warming has sparked a recognition of the need to develop clean renewable energy sources. Biomass gasification of abundant organic materials such as wood chips, forest residue and farm waste is a leading source of clean renewable energy that, in addition to other constituents, can result in a synthesis gas that can contain up to 19% hydrogen (H2) and 20% carbon monoxide (CO).

By chemically processing such constituent materials, useful gases may be recovered and used to produce various forms of energy, including electrical and mechanical energy. This electrical energy may be used to power homes, industrial buildings, and farm and industrial machinery located far away from a power grid.

Hydrogen fuel cells are a promising technology for use as electrical power sources. With only water as by-product and no greenhouse gases emissions, hydrogen fuel cells provide considerable environmental benefits. Fuel cells receive hydrogen as an input and return electrical energy that may be used in numerous applications. Hydrogen for fuel cells can be produced in several ways, such as through fossil fuel reformation, the steam-iron process, thermochemical water splitting, and water electrolysis.

Fossil fuel reforming accounts for approximately 95% today's hydrogen production, and is a chemical process in which steam reacts at a high temperature with a fossil fuel inside of a "reformer" to produce hydrogen and carbon monoxide. Reforming typically occurs in the presence of a metal-based catalyst and at high temperatures of 700 to 1100° C. This process can be applied to a large range of hydrocarbon feedstocks, including propane, gasoline, autogas, methanol, diesel fuel, and ethanol. However, this process is limited to the availability of fossil fuels, which will increase in cost and decrease in availability in the future.

The steam-iron process is one of the oldest known methods for producing hydrogen in which coal is gasified to a lean reducing gas made up of hydrogen and carbon monoxide. This gas then reacts with iron oxide, typically such as magnetite ($Fe_3O_4$), to produce wustite (FeO) and/or iron metal (Fe). Then, the wüstite and/or iron metal is re-oxidized with steam to form magnetite and H2 gas.

The steam-iron process takes place at temperatures ranging from 600 to 900° C., but may occur at lower temperatures when the reaction takes place in the presence of catalysts such as transition metal or potassium hydroxide. Further, the steam-iron process may also occur at lower temperatures when the reactive surface area of the iron-bearing water-reducing material is increased through processes such as grinding. However, the availability and price of coal, as well as use of a fossil fuel, remain a large drawback.

In thermochemical water splitting, the intense heat required to split water into hydrogen and oxygen is typically derived from concentrated sunlight or recycled waste heat from a nuclear reactor. Consequently, this process involves near-zero greenhouse gas emissions, but remains under development to identify reactor designs, systems, and materials that will be cost-efficient and durable. Therefore, a commercially viable thermochemical reactor is as of yet unavailable.

Similarly, conventional water electrolysis involves the splitting of water into hydrogen and oxygen via an electric current, but is very expensive and consumes high amounts of energy in comparison to fossil fuel-based processes. As an improvement to conventional water electrolysis, to reduce the amount of electrical energy required to facilitate water splitting, a method of supplying natural gas to the electrolyzer has been proposed, as reflected in U.S. Pat. No. 6,051,125.

However, this method requires fossil fuel consumption, as well as monitoring of electrodes that may become contaminated with carbon deposited by reaction of natural gas with oxygen. An alternative method of electrolyzing high-temperature steam at a high-temperature of 800° C. or higher. In this method, high levels of thermal energy are substituted for the high levels of electrical energy typically required to electrolyze water, thereby lowering reducing the electrical power required for water electrolysis. But, the required thermal energy is often derived from fossil fuels.

For hydrogen to be used in hydrogen fuel cells, a high degree of purity is critical as even trace impurities present in the H2 can poison the anode, membrane, and cathode of the fuel cell, resulting in reduced and inefficient performance. In order to efficiently produce ultraclean hydrogen that may be effectively used to generate electricity, carbon monoxide levels must be kept to an absolute minimum, particularly at less than 10 parts per million, to ensure that a hydrogen fuel cell remains efficient and functional.

Therefore, as hydrogen produced by the available known methods typically either includes unacceptable levels of impurities or, to produce H2 of sufficient purity or requires excessively high levels of energy input, there remains a need for a method of producing high purity hydrogen at low cost without greenhouse gases emissions.

SUMMARY

The following summary of the invention is intended to provide a basic understanding of some aspects of the invention. This summary is not meant to identify all key or critical elements of the invention or to delineate the entire scope of the invention. Its sole purpose is to present some concepts of the invention in a simplified form as a prelude to the more detailed description that is subsequently presented.

The present invention comprises a gasifier, a steam generator, a water gas shift reactor ("WGS"), a heat-exchange two-phase water separator, a scrubber, a hydrogen separator, and fluid conduits, in fluid communication with the various system components, which together convert hydrocarbon-based biomass, e.g., woodchips, into ultra-pure hydrogen gas. Fluid conduits connect the gasifier and the steam generator, separately, to the WGS, the WGS to the two-phase separator, the two-phase separator to the scrubber, and the scrubber to the hydrogen separator, which further comprises an outlet port through which hydrogen gas may flow free of carbon monoxide. The hydrogen may flow to a device that utilizes hydrogen to generate energy, such as a hydrogen fuel cell or to an internal combustion engine.

The gasification chamber breaks down biomass fuel into basic chemical elements through a series of chemical reactions to form a synthetic gas, or syngas, which flows out of the gasifier and into the fluid conduit connecting the gasifier to the WGS. The steam generator supplies steam to the syngas flow to increase the water vapor content of the syngas before entering the WGS. The steam and syngas mix and pass into the WGS where they react in the presence of a catalyst to form additional hydrogen gas mixed with other gases such as carbon dioxide, carbon monoxide, and nitrogen. The gas mixture passes through the scrubber where carbon monoxide is extracted. Then, the scrubbed gas passes into the carbon monoxide separator and the hydrogen separator where hydrogen is isolated from the remainder of the scrubbed gas mixture, providing a stream of ultra-pure hydrogen separated from the other byproduct gases.

In practice, biomass conversion begins when a user deposits biomass into the gasifier, creating syngas flow and mixes with the steam from the steam generator. Syngas conversion continues as biomass is fed into the gasifier. Simultaneously, syngas flows through fluid conduits where it is mixed with steam, and into the water gas shift, bubbling scrubber, and hydrogen separator. Operation of the system may terminate upon completion of biomass conversion into syngas and syngas purification into hydrogen gas and byproduct gases.

BRIEF DESCRIPTION OF THE DRAWINGS

Non-limiting and non-exhaustive features will be described with reference to the following figures, wherein like reference numerals refer to like parts throughout the various figures. The figures below were not intended to be drawn to any precise scale with respect to size, angular relationship, or relative position.

DETAILED DESCRIPTION

Figure 1:
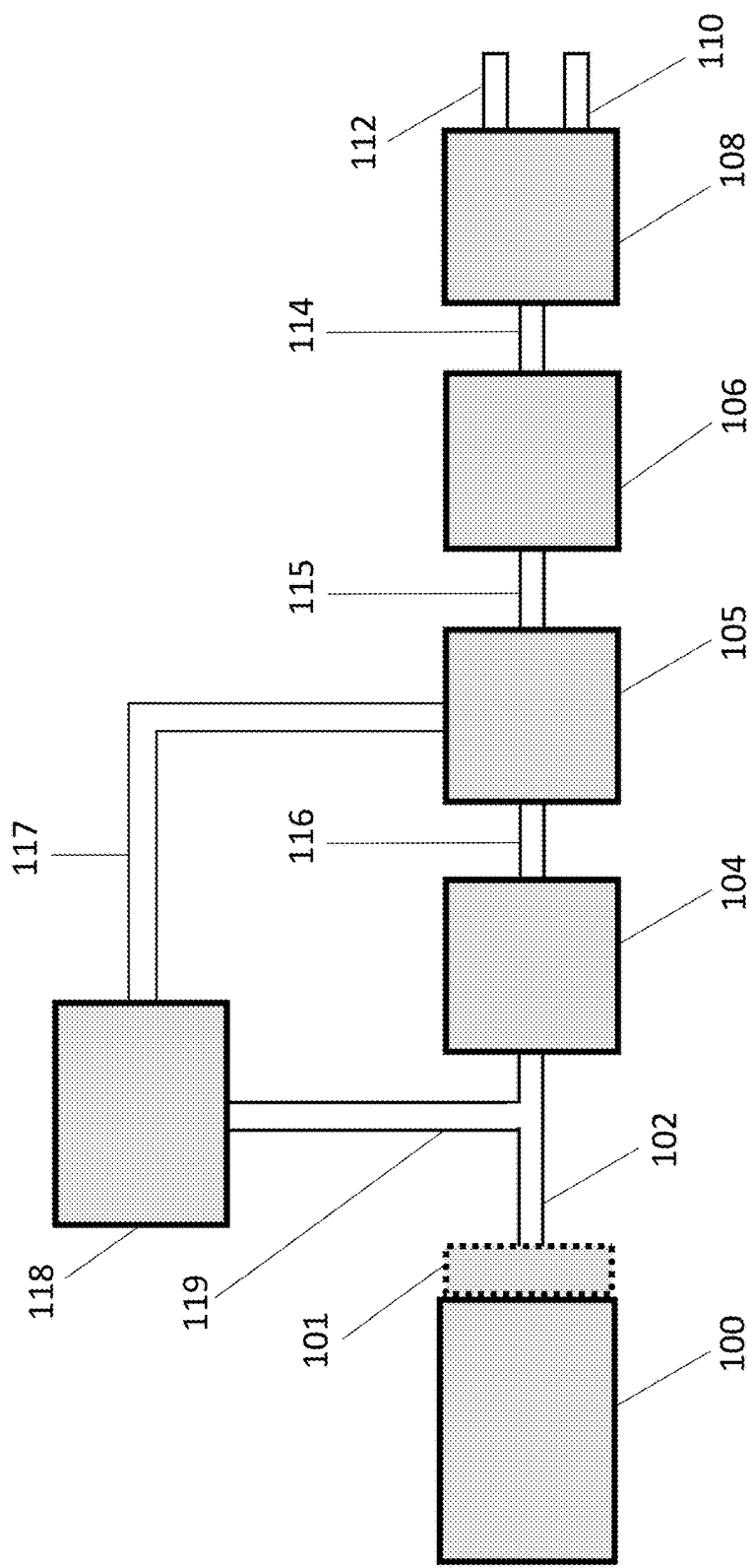
FIG. 1 is a schematic depicting a diagram of the individual components of the present invention

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation.

Many changes and modifications may be made within the scope of the present invention without departing from the spirit thereof and the invention includes all such modifications, such as, but not limited to implementing other types of gasifiers not of the down draft design, implementing various designs of bubbling scrubber devices or steam generators, or using various types of catalysts in the water gas shift reaction.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

The use of biomass as a source of energy dates back to the use of wood to create fires by early human species. Today, wood remains the largest source of biomass energy, and includes, but is not limited to, dead trees, branches, tree stumps, yard clippings, farm waste like corn husks, forest debris and wood chips. Industrial biomass is often grown from various types of small and medium plants such as tall grass and tree species, wherein any potential crops from the plant are harvested and the remainder of the plant is sold as biomass.

In the renewable energy market, the conversion of waste to energy is an attractive source of energy that has used systems such as incineration, with recent innovation resulting in systems such as gasification, pyrolysis, anaerobic digestion, and plasma gasification. On an industrial scale across the globe, few large-scale gasification applications are in place, with little to no commercial gasification being conducted in the United States. Current technologies harness energy from a wide range of waste products, such as fish and chicken farms, most garbage, plastics and manure, to create syngas.

The present invention comprises a novel system for converting biomass into ultra-pure hydrogen, including at least a gasifier, an oils and tars filter, a steam generator, a water gas shift reactor, a heat-exchange two-phase water separator, a scrubbing mechanism, an electrochemical separator, and fluid conduits, two phase separators establishing fluid communication with the various system components. The present invention converts biomass, e.g., woodchips, into a synthetic gas that is cleaned and purified through a series of thermal, chemical and electrical reactions and processes, resulting in ultra-pure hydrogen gas that may be used for a wide range of applications, e.g., in a hydrogen fuel cell.

In one embodiment, the hydrogen gas may be fed into a hydrogen fuel cell. After passing through the elements just described, the hydrogen is used by a hydrogen fuel cell to generate electricity. In another embodiment, hydrogen gas exiting the electrochemical separator of the present invention can be directed into an internal combustion engine, where it is ignited to generate mechanical energy that drives a component of the engine, e.g., a piston, rotor, or turbine blade.

Syngas produced from a gasifier undergoes several chemical reactions throughout this process, and a scrubber is incorporated into the present invention in an effort to remove as much carbon monoxide from the syngas as possible before hydrogen is separated from the syngas. As previously discussed in the Background section above, carbon monoxide needs to be removed from the hydrogen gas that is supplied to a conventional fuel cell because the carbon monoxide can contaminate and poison the anodes, membranes and cathodes, degrading performance and ultimately causing failure of the fuel cell.

FIG. 1 depicts the present invention, comprising a gasifier 100, an oils and tars filtration system 101, a steam generator 118, a water gas shift reactor ("WGS") 104, a heat-exchange two-phase water separator 105, a scrubber 106, a hydrogen separator 108, and fluid conduits 102, 119, 117, 116, 115, 114, 112, and 110. Fluid conduits 102, 119, 117, 116, 115 and 114 establish and provide a network of fluid communication between the elements just described, while fluid conduits 112 and 110 function to carry away hydrogen gas and other gases, respectively, from the hydrogen separator 108. In preferred embodiments, fluid conduit 112 may supply ultra-pure hydrogen gas to a hydrogen fuel cell, to an internal combustion engine or to a hydrogen gas storage system and receptacle.

As shown in FIG. 1, the WGS 104, the heat-exchange two-phase separator 105, the scrubber 106 and the hydrogen separator 108 are all connected downstream from the gasifier 100, wherein syngas leaving the gasifier travels through fluid conduit 102 to the WGS 104. Further, the steam generator 118 is connected to fluid conduit 102 downstream of the gasifier 100 by fluid conduit 119, and provides water vapor that is mixed into the syngas before it enters the WGS 104.

The WGS catalyst converts the water vapor and carbon monoxide into additional hydrogen gas and carbon dioxide, and a modified syngas product leaves the WGS 104 through fluid conduit 116 and passes through the heat-exchange two-phase water separator 105, through fluid conduit 115 and into the scrubber 106. Scrubbed syngas, i.e., having most of the carbon monoxide removed, then travels out of the scrubber 106, through fluid conduit 114 and into the hydrogen separator 108. Hydrogen gas exits the hydrogen separator 108 through fluid conduit 112 while other resulting byproduct gases exit the hydrogen separator 108 through fluid conduit 110.

The gasifier 100 functions to convert biomass into syngas, and this syngas product primarily includes molecules of carbon dioxide ($CO_2$), carbon monoxide (CO), hydrogen ($H_2$), and nitrogen ($N_2$) in a gaseous state. The steam generator 118 functions to create steam from liquid water ($H_2O$, i.e., "dihydrogen monoxide"), which may be mixed with the syngas output from the gasifier 100.

The WGS 104 functions to convert carbon monoxide and water into carbon dioxide and water, thereby facilitating removal of carbon monoxide from the syngas. Because the WGS reaction is typically slow at low temperatures, the WGS 104 contains a catalyst that facilitates the chemical reaction between the carbon monoxide and water vapor. The resulting gas mixture of the modified syngas product includes primarily molecules of nitrogen, carbon dioxide, additional hydrogen and water vapor, with only relatively much smaller amounts of carbon monoxide remaining.

Most of the water vapor exiting the WGS 104 will next be cooled and condensed by the heat-exchange two-phase water separator 105, with the condensed liquid water then being recycled back to the steam generator. The gaseous fraction of the fluid processed by the heat-exchange two-phase water separator 105 is then sent through fluid conduit 115 to the scrubber 106.

The scrubber 106 functions to remove most of the remaining carbon monoxide from the modified syngas product following processing by the WGS 104. Finally, the hydrogen separator 108 isolates hydrogen gas from other the other modified syngas product components and outputs hydrogen gas separate from the byproduct gases, which now include primarily carbon dioxide and nitrogen.

In operation, biomass is fed into the gasifier 100 where it chemically reacts in the presence of heat to form syngas and ash. Hot syngas exits the gasifier 100 through the syngas outlet port 128, which connects to fluid conduit 102. Simultaneously, water vapor from the steam generator 118 travels through fluid conduit 119 into fluid conduit 102 where it comes into fluid contact with the syngas and mixes to form a water vapor-enriched syngas.

Aside from syngas, the gasifier 100 may produce tar that is not utilized by the present invention and requires filtration from the syngas before the syngas enters subsequent elements of the present invention. In order to achieve maximum efficiency of the present invention, tar must be filtered from the syngas before it enters the WGS 104, and is preferably filtered from the syngas immediately after exiting the gasifier 100 by an oils and tars filtration system 101. Among other mechanisms capable of implementing the oils and tars filtration system 101, and in a preferred embodiment oils and tars are filtered by an activated carbon system.

Water vapor exiting the steam generator 118 passes into fluid conduit 119 which is in fluid communication with fluid conduit 102 such that syngas from the gasifier 100 comes into fluid contact with the hot water vapor in fluid conduit 102. A pump may be implemented to move water vapor from the steam generator 118 through fluid conduit 119 and into fluid conduit 119, which pump may comprise any type of pump, specifically including, but not limited to, an aspirator pump, venturi pump, or other pump enabling a venturi or venture-type effect. However, it should be understood that the claimed subject matter is not intended to be limited in scope to employing a pump to move hot water vapor through fluid conduit 119 to fluid conduit 102, and may not include any pump whatsoever, or may achieve water vapor movement via other means.

The mixture of syngas and water vapor travels through fluid conduit 102 to the WGS 104, where a catalyst facilitated chemical reaction converts carbon monoxide and water vapor into carbon dioxide and hydrogen gas according to the equation $CO+H_2O=CO_2+H_2$, essentially transferring the oxygen atom from a molecule of water vapor ($H_2O$) and adding it to a carbon monoxide (CO) molecule to make carbon dioxide ($CO_2$). The water vapor molecules ($H_2O$)

having been stripped of their oxygen atoms, transform into hydrogen gas molecules (H2).

This modified syngas product (hydrogen enriched syngas) exits the WGS 104, passes through fluid conduit 116 and flows through the heat-exchange two-phase water separator 105, where water vapor is condensed into liquid water and removed, into fluid conduit 115 and into the scrubber 106, which functions to remove most of the carbon monoxide remaining in the modified syngas product output by the WGS 104.

Scrubbed gas flows out of the scrubber 106 through fluid conduit 114 into the hydrogen separator 108 where the hydrogen gas is chemically separated from the remainder of the gas mixture. Hydrogen gas leaves the hydrogen separator 108 through fluid conduit 112 and the remainder of byproduct gases in the gas mixture exit the hydrogen separator 108 through fluid conduit 110.

The gasifier 100 serves as the source of syngas synthesis in the present invention, converting biomass into syngas. In preferred embodiments, a co-current fixed bed "down draft" style gasifier is implemented. However, the gasifier design may also be implemented as, but is not limited to, a counter-current fixed bed "up draft" style gasifier, inclined rotary style gasifier, fluidized bed, entrained bed, or plasma gasifier.

Figure 2:
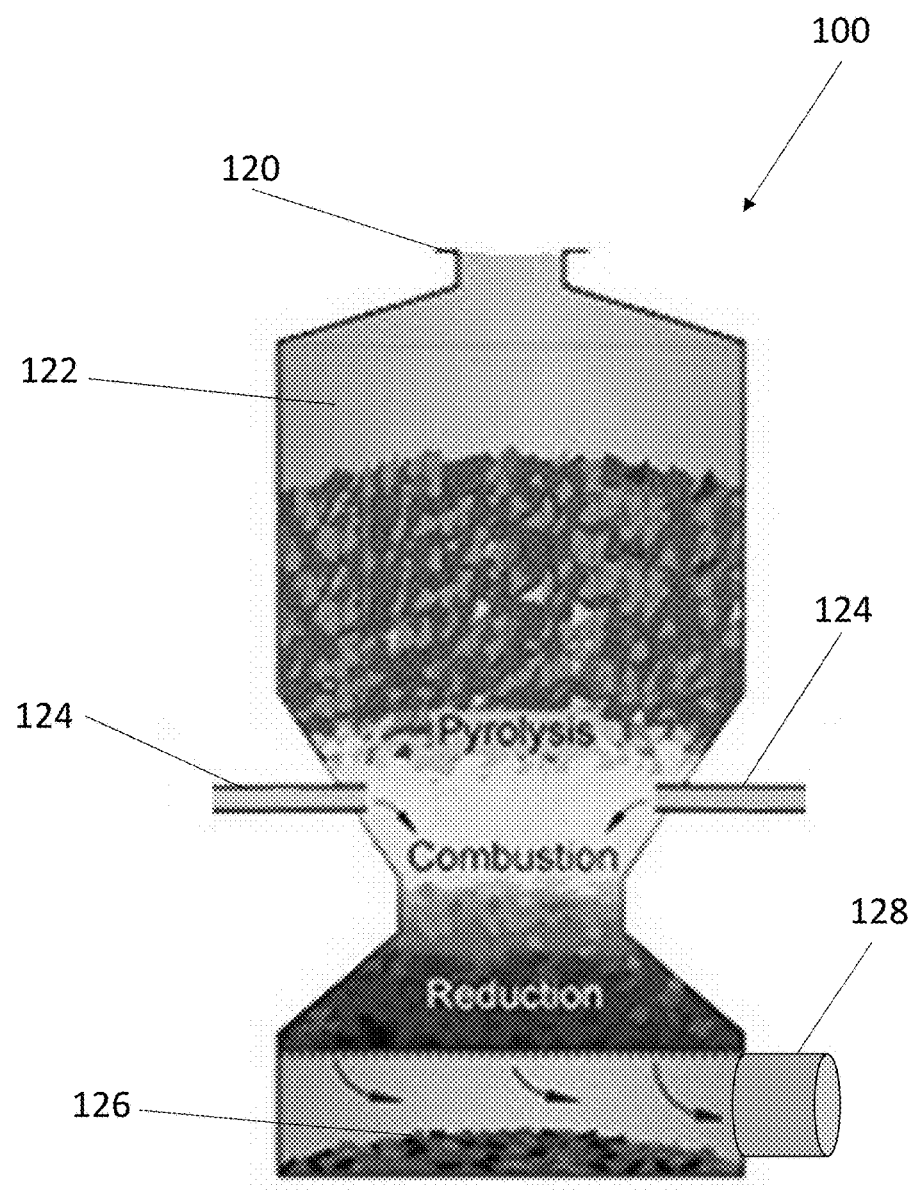
FIG. 2 is a schematic depicting an exemplary down draft gasifier.

The down draft gasifier presents the ideal configuration of gasifier design to achieve maximum hydrogen gas production from input biomass, and by implementing a down draft gasifier the present invention attempts to maximize hydrogen production efficiency. FIG. 2 depicts the general structure of a down draft gasifier, in which a series of thermochemical reactions involving intense heat occur, which break down the biomass feedstock into a gaseous mixture of chemical compounds, i.e., syngas.

Biomass feedstock enters the gasification chamber 122 through the chamber inlet port 120. Here, the feedstock is farthest away from the source of heat but receives enough heat to experience moisture off-gassing and removal, i.e., drying of the feedstock. Next, the feedstock descends further to a hotter portion of the gasification chamber 122, called the "zone of pyrolysis," wherein the dried feedstock undergoes a thermochemical process in which the physical phase and chemical composition of the feedstock change in the presence of heat. This thermochemical process results in the production of a mixture of pyrolysis gases and ash.

After undergoing pyrolysis, the resulting gases and ash move into a lower zone in the gasification chamber 122 where they are exposed to an extremely intense plane of heat generated by the combustion of feedstock and pyrolysis gases sustained by a gasification agent, e.g., oxygen. This oxygen, or other gasification/oxidation agents, may enter the gasification chamber 122 through the agent inlet port 124, or ports, where it combusts and provides heat throughout the gasification chamber 122.

The exposure of pyrolysis gases to the intense plane of heat results in thermochemical cracking of the gases, wherein the gases decompose into smaller molecules and basic elements, such as carbon, nitrogen, oxygen, and hydrogen. These molecules and elements then pass into a lower zone within the gasification chamber 122 where they undergo oxidation and reduction reactions in which excited electrons are exchanged between molecules and atoms to form a mixture of chemical compounds such as hydrogen gas (H2), carbon dioxide (CO2), carbon monoxide (CO), and nitrogen gas (N2). This mixture of hot gases, i.e., the syngas product, exits the gasification chamber/reactor 122 through the syngas outlet port 128, while ash falls to the bottom of the chamber to the ash depository 126.

Figure 3:
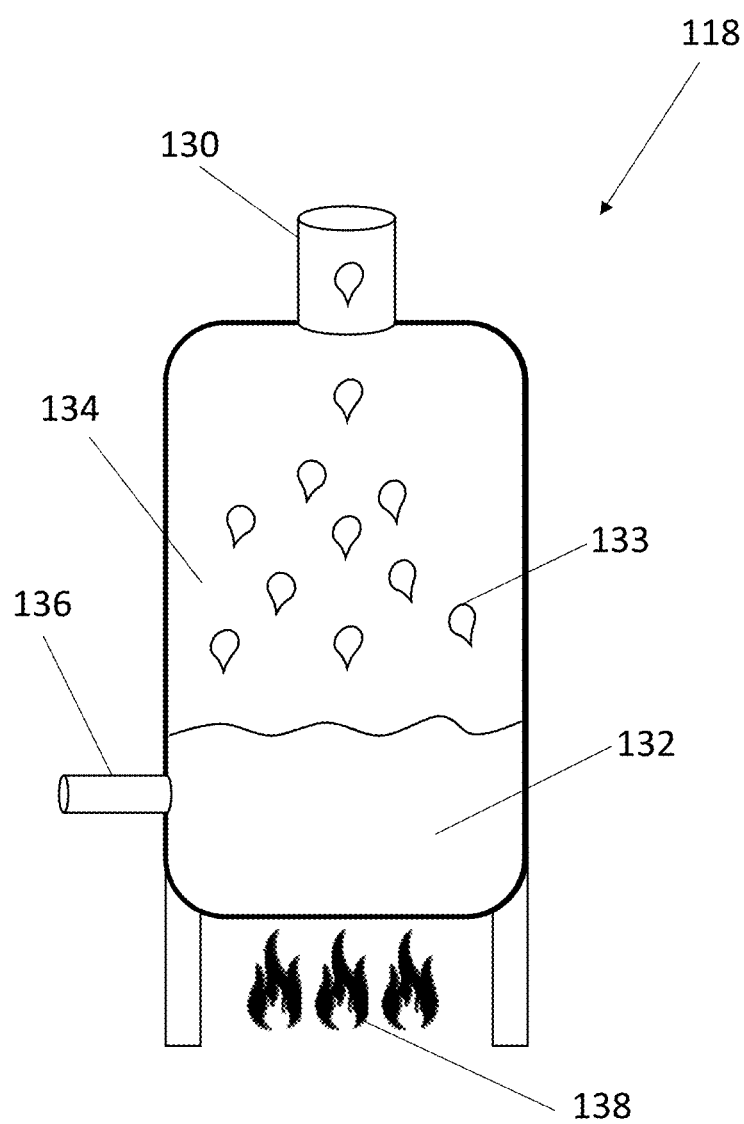
FIG. 3 is a schematic depicting an exemplary steam generator.

FIG. 3 depicts the general structure of a steam generator 118, which produces water vapor that may be mixed into the syngas output by the gasifier 100. The steam generator 118 boils water to convert it from a liquid phase to a gaseous phase. The steam generator 118 generally comprises a heating chamber 134, water inlet port 136, steam outlet port 130, and heating element 138. The water inlet port 136 allows water to flow into the heating chamber 134 and the steam outlet port 130 allows steam and/or water vapor to exit the heating chamber 134.

Various types of heating elements 138 may be implemented to provide heat to the heating chamber 134, such as those including, but not limited to, an open flame fed by biomass, natural gas or other fuel, or an electric heating coil. In preferred embodiments, the same type of fuel used for the gasifier 100 (e.g., biomass) may also be used to produce heat for the steam generator 118.

And, in preferred embodiments implemented to achieve maximum possible efficiency of the present invention, residual heat from the gasifier 100 may be captured and repurposed to assist in steam generation. An air inlet 153, may be provided to ensure an appropriate supply of air or other oxidizing agent to sustain combustion of the fuel utilized to heat the heating chamber 134.

In operation, liquid water flows through the water inlet port 136 into the heating chamber 134, where it receives heat from the heating element 138 via radiation and conduction, and then internally through convection of the liquid water. As heat is transferred through the heating chamber 134 from the heating element 138 to the liquid water 132, it warms and reaches the boiling point, i.e., the temperature of vaporization, wherein the liquid water undergoes a phase change and converts into water vapor 133. Hot water vapor 133 rises inside of the heating chamber 134 and flows out of the heating chamber 134 through the steam outlet port 130.

In preferred embodiments, the steam generator is designed such that the maximum amount of heat may be obtained from the heating element 138, so as to improve the overall efficiency of the preset invention. This may be achieved by, but is not limited to, implementation of a two-coil design (as shown in FIG. 4) in which water travels through the two coils, 148 and 150, contained within the heating chamber 134, where it is heated to the point of vaporization.

Figure 4:
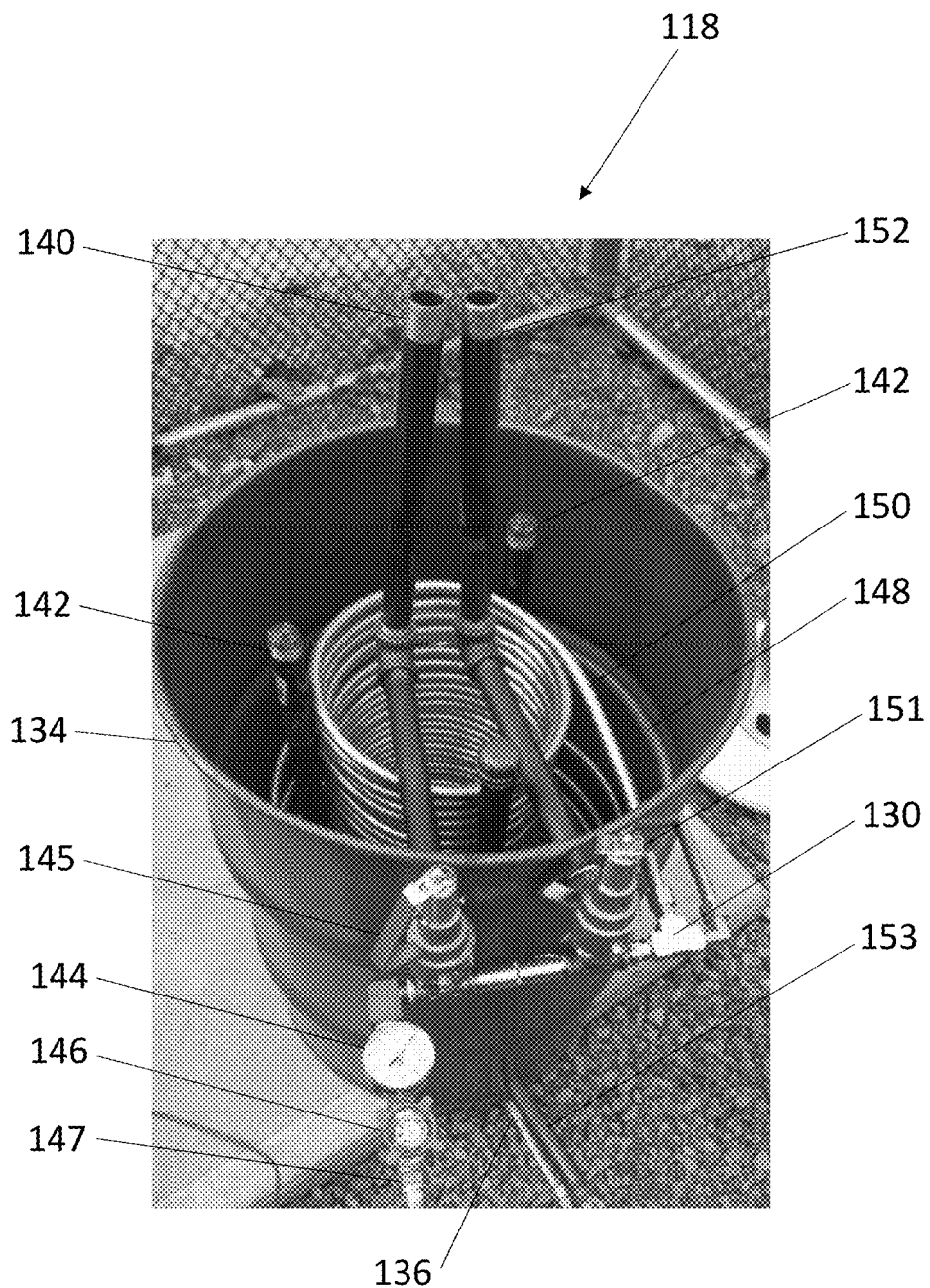
FIG. 4 is a photograph depicting a sample configuration of a steam generator designed to maximize heat absorption and fuel source efficiency.

FIG. 4 depicts a steam generator 118 featuring a two-coil design, wherein the standing liquid water 132 depicted in FIG. 3 is replaced by two water-filled heating coils, which function to absorb heat radiated by the heat source 138 and convected inside the heating chamber 134 and to transfer that heat via conduction to the water 132 contained inside the coils. The coil stabilizers 142 function to secure and center the inner heating coil 150 within the heating chamber 134 and also to maintain the location of the outer coil close to the peripheral wall of the chamber 134 in order to minimize heat loss by the steam generator 118 to the ambient environment.

The outer heating coil 148 runs along the outside plane of the heating chamber 134, and the inner heating coil 150 is placed in the center of the heating chamber 134. Both the inner heating coil 150 and outer heating coil 148 (together "heating coils") are connected to the steam outlet port 130 to carry steam and/or water vapor away from the steam generator 118. A pressure gauge 144 may be connected downstream, in fluid communication with the steam outlet port 130, thereby enabling a user to determine pressure inside of the heating coils, 150 and 148. The water inlet port 136 and fluid conduit 117 supply liquid water to the inner and outer heating coils, 150 and 148 respectively, located within the heating chamber 134.

FIG. 4 further depicts pressure relief valves 145 and 151, pressure meter 144, steam shut-off valve 146 and water vapor connector port 147, which together function to enable water vapor to flow from the steam generator 118 into fluid conduit 119. These aforementioned components are designed to ensure that the system will not experience a potential catastrophic build-up of pressure that could cause the steam generator 118 or its components to rupture or explode.

The pressure relief valves 145 and 151 are placed downstream of the heating coils, wherein pressure relief valve 151 is placed immediately downstream of the steam outlet port 130 and pressure relief valve 145 is downstream of pressure relief valve 151. Pressure relief valve 151 is configured to receive a flow of steam from the heating coils and output that steam to pressure relief valve 145 or to waste steam outlet pipe 152.

Pressure relief valve 145 is configured to receive a flow of steam from pressure relief valve 151 and output a flow of steam to waste steam outlet pipe 140 or to fluid conduit 119. Waste steam outlet pipes 140 and 152 function to carry steam from the steam generator 118 away from the steam generator, and deposit that steam into a medium including, but not limited to, the surrounding environment.

Pressure meter 144, downstream of pressure relief valve 145, functions to provide to a user a pressure reading of the steam and/or water vapor as it departs the steam generator 118 and travels into fluid conduit 119. Steam shut off valve 146 enables a user to shut off the flow of steam into fluid conduit 119. Water vapor connector port 147 functions to provide fluid communication between the steam shut-off valve 146 and the fluid conduit 119.

In operation, as steam and/or water vapor leaves the heating chamber 134 and the inner and outer heating coils, 150 and 148 respectively, water vapor passes through pressure relief valves, 151 and 145, through the pressure meter 144 and the steam shut off valve 146, through the water vapor connector port 147 and into fluid conduit 119, before entering and being mixed with the syngas from the gasifier in fluid conduit 102. Water vapor may be released into the environment by pressure relief valves, 145 and 151, if the pressure in the steam generator 118 exceeds a safe pressure limit.

Water vapor that is exhausted into the environment may be directed through pressure relief valve 151 to exit the steam generator via waste steam outlet pipe 152 or through pressure relief valve 145 to exit via waste steam outlet pipe 140. However, if the water vapor pressure remains below the safe limit, the safety valves remain closed and the water vapor flows through the pressure meter 144 and steam shut off valve 146, through the water vapor connector port 147 and into fluid conduit 119.

Figure 5:
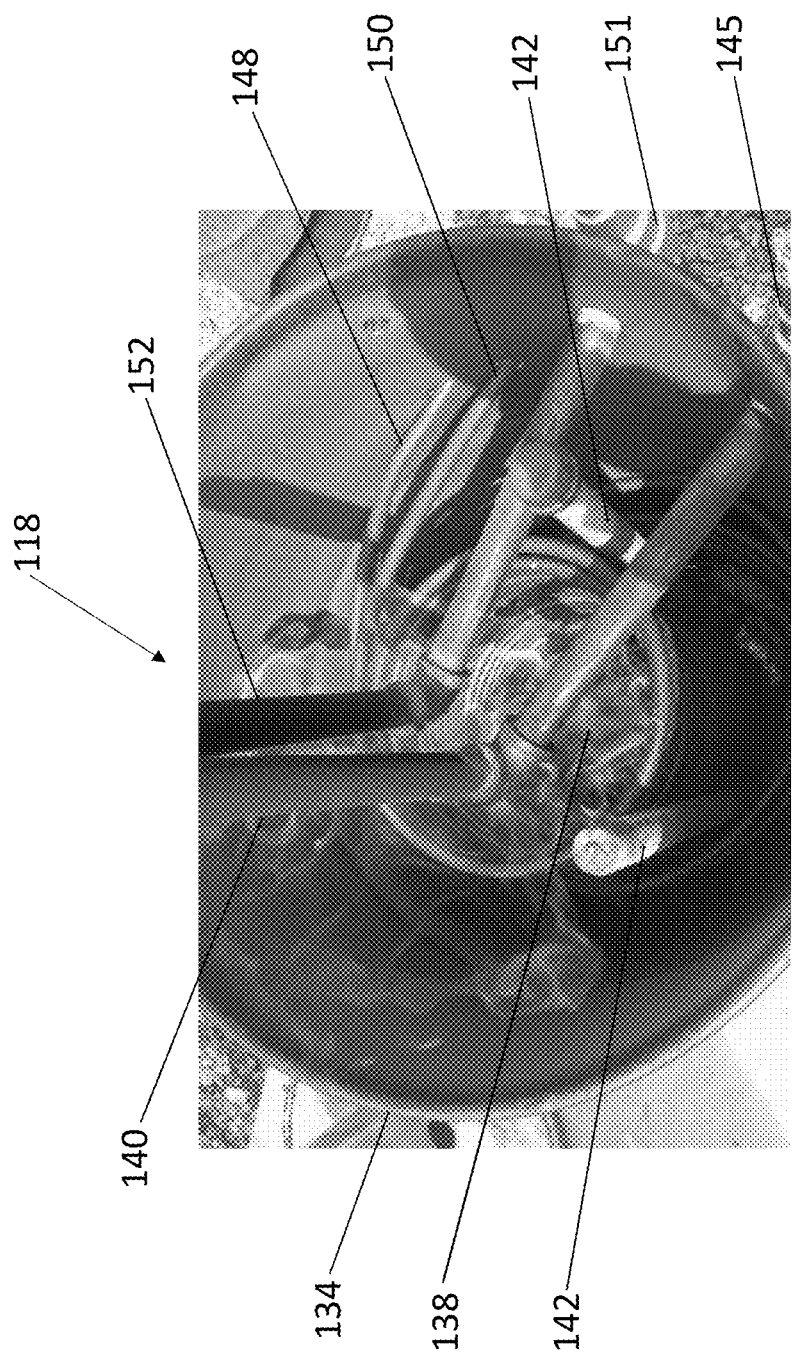
FIG. 5 is a photograph of a steam generator operating to create steam and water vapor.

FIG. 5 depicts the two-coil design for a steam generator 118 in operation. Liquid water flows into the steam generator 118 through the fluid conduit 117 and water inlet port 136 (not depicted in FIG. 5) and passes into the heating coils, 150 and 148, located inside of the heating chamber 134. Water travels through the heating coils and receives heat from the heating coils, this heat being transferred by and received from the heating element 138, i.e., an open flame, via conduction, radiation, and/or convection of the air inside of the heating chamber 134.

As the liquid water continues to travel through the heating coils it reaches the point of vaporization, boils and transforms into gaseous water vapor. This water vapor then passes through the remainder of the heating coils and into the steam outlet port 130 (not depicted in FIG. 5).

Figure 6:
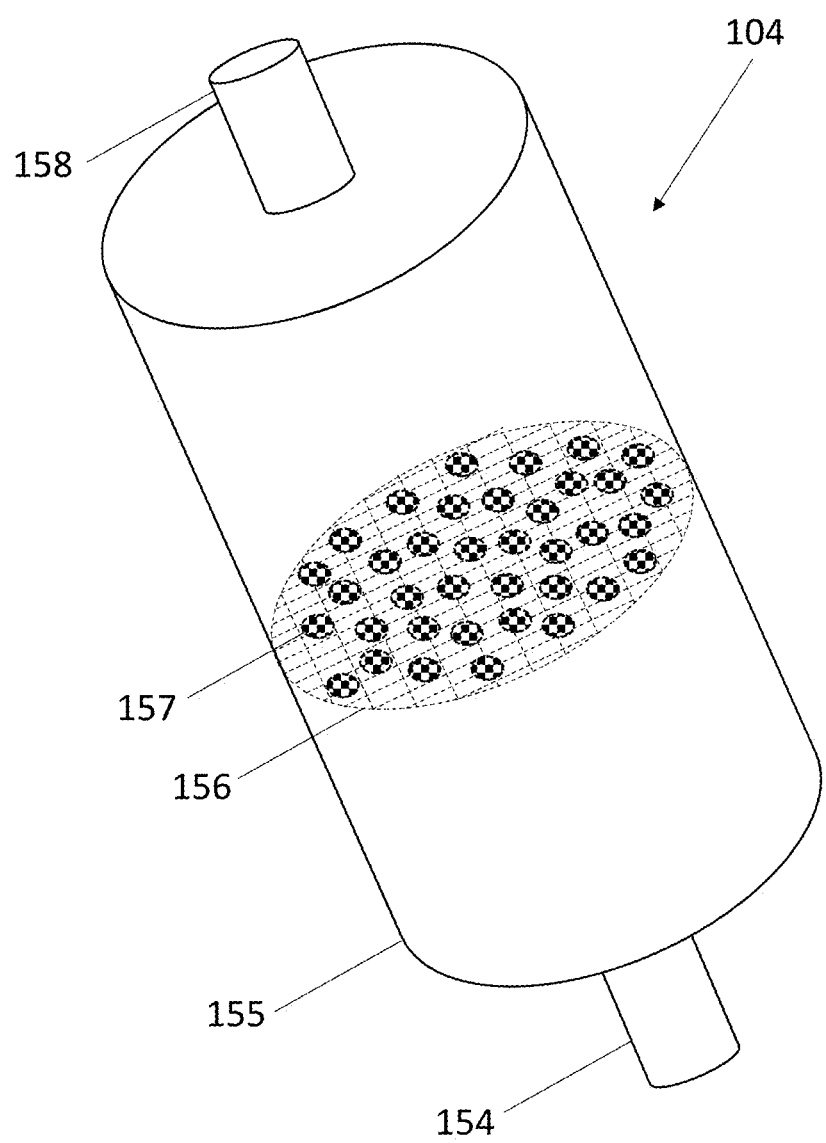
FIG. 6 is a schematic depicting the structure and composition of an exemplary water gas shift reactor.

FIG. 6 depicts the water gas shift reactor 104, which comprises the WGS reaction chamber 156, WGS inlet port 155, catalyst platform 156, catalyst 157, and gas outlet port 158. The catalyst 157 contained inside of the WGS reaction chamber 156 facilitates a chemical reaction in which water vapor from the steam generator 118 that is mixed with the syngas product reacts with carbon monoxide in the syngas-water vapor mixture to form carbon dioxide and hydrogen gas.

As a result of the WGS reaction, the amount of carbon monoxide included in the syngas-water vapor mixture is reduced while the amount of hydrogen gas in the syngas-water vapor mixture is increased. Consequently, this reaction serves a dual purpose of both increasing the amount of the desired end product, i.e., hydrogen, while reducing the amount of toxic carbon monoxide that may poison a hydrogen fuel cell.

As shown in FIG. 6, the catalyst platform 156 functions as a mesh, grating or other porous surface that supports the catalyst while also permitting the flow of syngas-water vapor mixture through the WGS reaction chamber 156. The catalyst 157 facilitates the WGS reaction just described by lowering the amount of "energy of activation" required for this reaction to occur, thereby allowing a greater proportion of the reactant species, i.e., carbon dioxide and water vapor, to acquire sufficient energy of activation to undergo this reaction.

The composition of the catalyst 157 is 32-33% CuO, 34-53% ZnO, and 15-33% $Al_2O_3$. The active catalytic species is CuO, with the function of ZnO being to provide structural support and prevent poisoning of the copper by sulfur. The $Al_2O_3$ prevents dispersion and pellet shrinkage.

The catalyst 157 operates in the range of 200° C. to 250° C. Low reaction temperatures of the catalyst 157 must be maintained due to the susceptibility of copper to thermal sintering. These lower temperatures also reduce the occurrence of side reactions that are observed in the case of other catalysts, that operate at higher temperatures. Noble metals such as Pt supported on ceria have also been extensively used for LTS.

The composition of the other catalysts is 74.2% $Fe_2O_3$, 10.0% $Cr_2O_3$, and 0.2% MgO (with volatile components comprising the remaining unaccounted-for percentage). The chromium acts to stabilize the iron oxide and prevents sintering.

The other catalysts operate within the temperature range of 310° C. to 450° C., with temperature increasing along the length of the reactor due to the exothermic nature of the reaction. As such, inlet temperatures are typically maintained at 350° C. to prevent exit temperatures from exceeding 550° C. Industrial reactors generally operate at a range from atmospheric pressure to 8375 kPa.

In preferred embodiments, the catalyst 157 comprises copper oxide-zinc oxide-alumina $CuO/ZnO/Al_2O_3$. In addition, the preferred ratio of water vapor to syngas in the syngas-water vapor mixture is 5:1, water vapor to syngas. This ratio enables the maximum efficiency of the present invention.

In operation, the syngas-water vapor mixture enters the WGS reaction chamber 156 through the WGS inlet port 155. Once inside the WGS reaction chamber 156, the syngas-water vapor mixture passes through the catalyst platform 156 and comes into contact with the catalyst 157.

Upon contact, the chemical reaction just described occurs inside of the WGS reaction chamber 156, wherein water vapor in the syngas-water vapor mixture is split into hydrogen gas and oxygen, the oxygen bonding with any carbon monoxide present to form carbon dioxide. After the chemical reaction occurs, resulting gas mixture flows out of the WGS reaction chamber 156 through the gas outlet port 158.

Most of the water vapor exiting the WGS 104 will cooled and condensed by the heat-exchange two-phase separator 105 and then recycled back to the steam generator. Liquid water condensed by the two-phase separator 105 may be directed through fluid conduit 117 (FIG. 1) to the water inlet port 136 of the steam generator 118 for recycling in the steam generator 118 and reconversion into water vapor to be mixed with syngas in fluid conduit 102. The gaseous fraction of the fluid processed by the heat-exchange two-phase separator 105 is sent through fluid conduit 115 to the scrubber 106.

Figure 7:
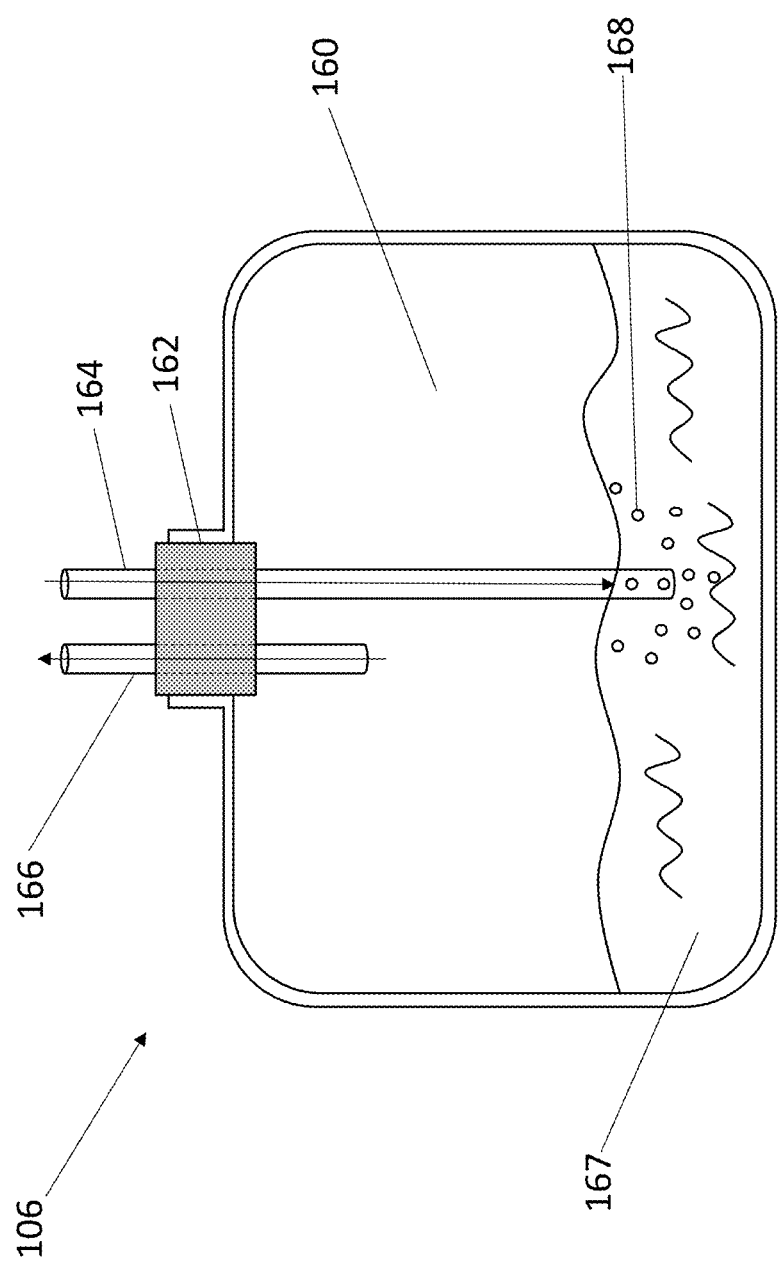
FIG. 7 is a schematic depicting the general structure of an exemplary bubbling scrubber.

The scrubber 106 is included in the present invention to facilitate removal of carbon monoxide from the gas mixture before hydrogen gas is separated from the gas mixture and, as depicted in FIG. 7, a preferred embodiment of the present invention may include a scrubber 106 that comprises a bubbling scrubber, where the gas mixture passes through a chemical solution that removes carbon monoxide that remains in the gas mixture following the water-gas-shift reaction in the WGS reactor 104.

And, as depicted in FIG. 7, in preferred embodiments the scrubber 106 may comprise a bubbling scrubber. Specifically, the bubbling scrubber 106 may employ methanol or a similar liquid as the working fluid.

As shown in FIG. 7 the bubbling scrubber 106 may include, but is not limited to, a gas mixture inlet pipe 164, bubbling chamber 160, a scrubbing solution and/or suspension 167, bubbler stopper 162, and scrubbed gas outlet pipe 166. The bubbling chamber 160 houses the scrubbing solution 167, and further comprises an air-tight seal created by the bubbler stopper 162 to ensure that gas mixture does not escape the bubbling chamber 160 other than through the scrubbed gas outlet pipe 166.

The gas mixture inlet pipe 164 is configured to carry gas mixture received from fluid conduit 115 to the bottom of the bubbling chamber 160, such that gas mixture may exit the gas mixture inlet pipe 164 directly into the scrubbing solution and/or suspension 167. The scrubbed gas outlet pipe 166 is configured such that it receives only gas mixture that has passed through the scrubbing solution and/or suspension 167, and functions to permit gas mixture that has passed through the scrubbing solution and/or suspension 167 to exit the bubbling chamber 160. The scrubbed gas outlet pipe 166 connects to fluid conduit 114 through which gas mixture may travel to the hydrogen separator 108.

In preferred embodiments, the scrubbing solution and/or suspension 167 comprising copper (I) chloride suspended in methanol. In these preferred embodiments, as syngas passes through the methanol-based copper (I) chloride suspension carbon monoxide present in the gas mixture is removed from the gas mixture and attaches to the copper (I) chloride, forming a metal complex having the chemical formula CuCl(CO).

Figure 8:
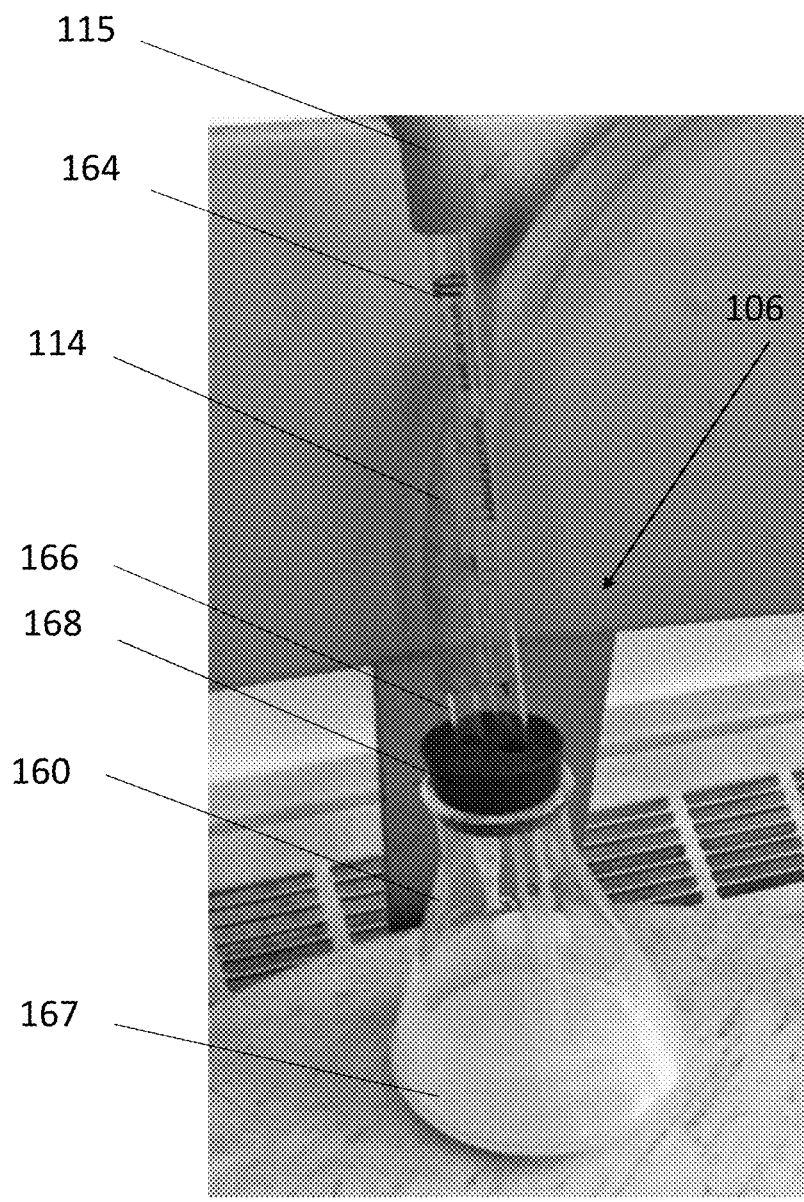
FIG. 8 is a photograph depicting an exemplary configuration of the bubbling scrubber using a standard laboratory beaker.

FIG. 8 depicts a sample configuration of the bubbling scrubber 106 in which a standard laboratory beaker is implemented to provide the structure and bubbling chamber 160 for the bubbling scrubber 106. The beaker is filled with the scrubbing solution and/or suspension 167 and the bubbler stopper 162 is affixed in position at the top of the beaker to provide an air-tight seal.

The gas mixture inlet pipe 164 passes through the bubbler stopper 162 and extends into the scrubbing solution and/or suspension 167 at the bottom of the bubbling chamber 160. The scrubbed gas outlet pipe 166 passes through the bubbler stopper 162 and extends only into the head portion of the bubbling chamber 160, i.e., the part of the chamber not filled with scrubbing solution and/or suspension, so as to only receive a scrubbed gas mixture that has passed through the scrubbing solution and/or suspension 167.

In operation, gas mixture from fluid conduit 115 flows into the bubbling scrubber 106 through gas mixture inlet pipe 164, and is carried to the bottom of the bubbling chamber 160 where it bubbles into the scrubbing fluid, a methanol suspension of copper (I) chloride (i.e., CuCl suspended in methanol). The gas mixture forms pockets of gas 168, i.e., bubbles, in the methanol suspension of copper (I) chloride, that rise from the bottom of the scrubbing fluid 167 to the top of the scrubbing solution and/or suspension 167 and into the head portion of bubbling chamber 160.

As the bubbles pass through the scrubbing solution and/or suspension 167, carbon monoxide present in the gas mixture remains behind in the scrubbing solution and/or suspension 167, thereby decreasing the amount of carbon monoxide present in the gas mixture exiting the bubbling scrubber 106. The gas mixture exits the bubbling chamber 160 through scrubbed gas outlet pipe 166 and is carried away from the bubbling scrubber 106 by fluid conduit 114.

The hydrogen separator 108 functions to isolate and separate hydrogen gas from the remaining gases in the gas mixture received from the bubbling scrubber 106. The hydrogen separator 108 receives an input of gas mixture from the bubbling scrubber 106 and outputs two independent streams of fluid through fluid conduits 112 and 110, wherein fluid conduit 112 contains hydrogen gas and fluid conduit 110 contains a mixture of the remaining gases of the gas mixture, including carbon dioxide and nitrogen. Hydrogen gas separation may be achieved by mechanisms including, but is not limited to, an electrochemical separator, a pressure swing absorption device, or a palladium, platinum or other transition metal-catalyst based membrane purification system.

Figure 9:
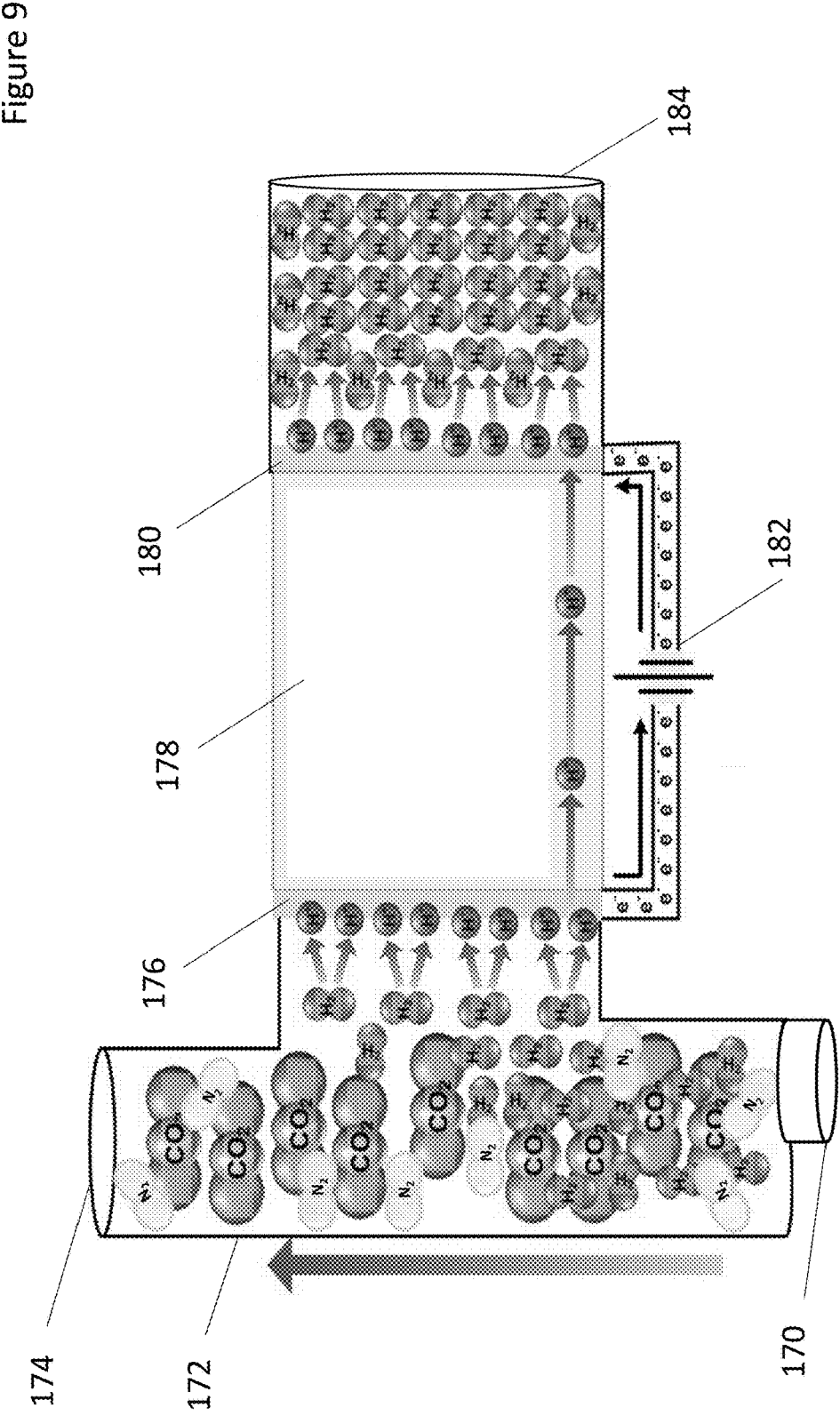
FIG. 9 is a schematic depicting an exemplary configuration of the electrochemical hydrogen separator, implemented to achieve purification of the hydrogen gas.

FIG. 9 depicts a schematic of an electrochemical separator, which is implemented in preferred embodiments as a hydrogen separator 108 in an effort to reduce costs of making the present invention while also achieving maximum hydrogen separation. The electrochemical separator comprises a scrubbed gas inlet port 170, said port receiving a flow of gas mixture from fluid conduit 114, electrochemical separator gas input flow channel 172, an anode 176, an electrolyte 178, a cathode 180, external circuit 182, a hydrogen gas outlet port 184, which outputs a flow of hydrogen gas to fluid conduit 112, and a waste gas outlet port 174, which outputs a flow of mixed waste gases to fluid conduit 110.

In operation, gas mixture flows through the scrubbed gas inlet port 170 into the electrochemical separator gas input flow channel 172. In the electrochemical separator gas input flow channel 172, hydrogen molecules contained in the gas mixture separate from the gas mixture and come into contact with the anode 176, while remaining nitrogen and carbon dioxide gases in the gas mixture flow to and out of the waste gas outlet port 174.

Upon contact with the anode 176, hydrogen molecules dissociate into protons and electrons. These protons conduct from the anode 176 through the electrolyte 178 to the cathode 180; simultaneously, the free electrons pass from the anode across the external circuit 182 and are deposited at the cathode 180.

Upon reaching the cathode 180 side of the electrolyte 178, protons and electrons bond to form hydrogen atoms and hydrogen atoms bond to form H2 gas. This hydrogen gas then exits the electrochemical separator through the hydrogen gas outlet port 184 into fluid conduit 112. In preferred embodiments, the electrolyte 178 may comprise a bipolar separator plate, such as a polymer electrolyte membrane.

The elements of the present invention just described together function to produce ultra-pure hydrogen gas that may be used in a variety of applications, including, but no limited to, in a hydrogen fuel cell that generates electricity or in an internal combustion engine. Hydrogen is first present in the syngas produced by the gasifier, and the latter elements of the present invention function to increase the amount of hydrogen gas present in the fluid passing through the present invention while decreasing and effectively eliminating carbon monoxide content.

As a result, hydrogen may be removed from the syngas in the present invention as early as directly after the gasifier 100, before reaching other elements. However, as the purpose of the present invention is to produce ultra-pure hydrogen gas that is free of other chemical elements and molecules, the purest hydrogen gas will be found after passing through the hydrogen separator 108.

In one embodiment for application with a hydrogen fuel cell, hydrogen gas departing the hydrogen separator 108 travels through fluid conduit 112 into a fuel cell that produces electricity, which fuel cell may comprise, but is not limited to, a proton exchange membrane ("PEM") fuel cell, phosphoric acid fuel cell ("PAFC"), solid oxide fuel cell ("SOFC"), hydrogen-oxygen fuel cell, or molten carbonate fuel cell ("MCFC").

Figure 10:
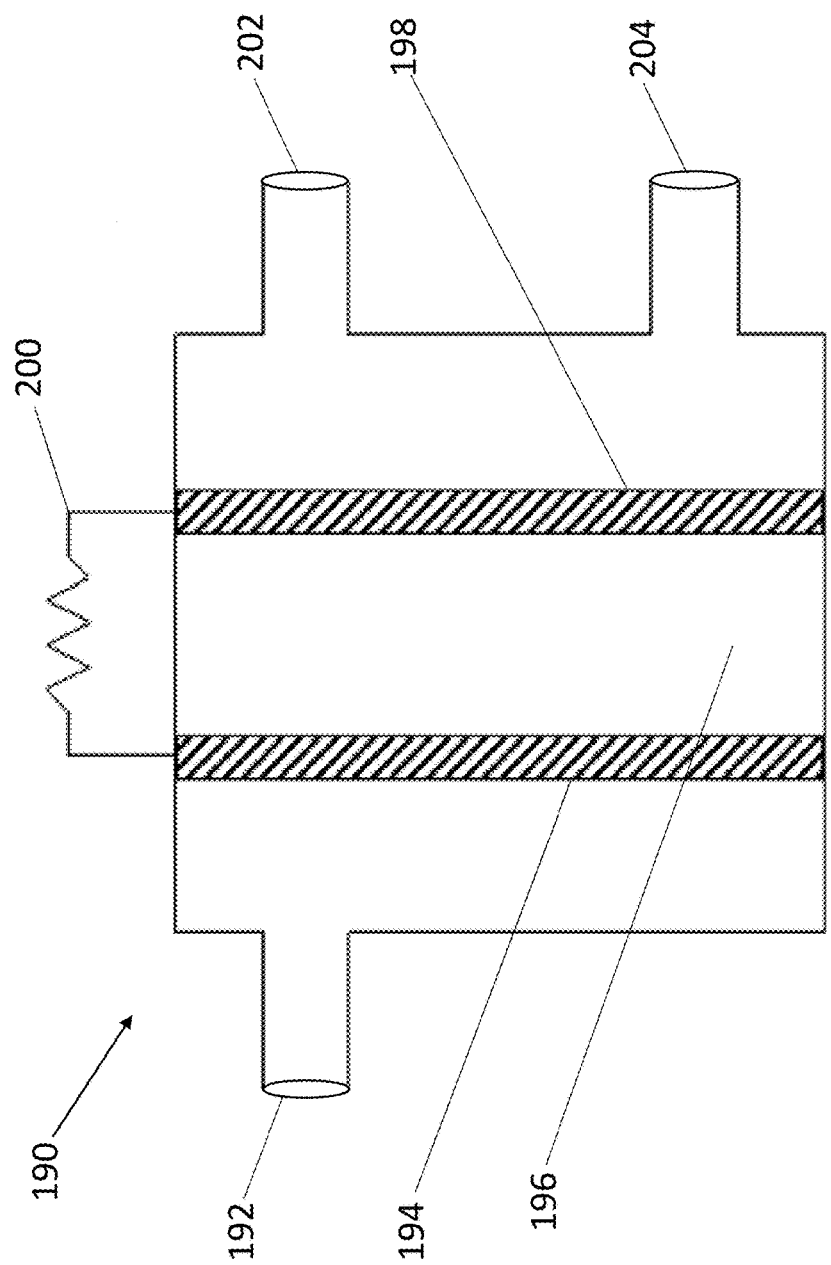
FIG. 10 is a schematic depicting the structure of an exemplary hydrogen fuel cell.

FIG. 10 depicts a schematic of a PEM fuel cell 190, which functions to generate electricity by passing the electron of a hydrogen atom across external circuit 200. The PEM fuel cell 190 comprises an anode 194, a porous proton exchange membrane 196, a cathode 198, as well as an external circuit 200, hydrogen gas inlet port 192, air inlet port 202, and water outlet port 204. Electricity may be drawn from the external circuit 200 that acts as a bridge around the proton exchange membrane 196 for electrons.

In operation, hydrogen gas enters the PEM fuel cell 196 from fluid conduit 112, through the hydrogen gas inlet port 192 and comes into contact with the anode 194, where hydrogen atoms dissociate into protons and electrons. Following dissociation, protons are conducted through the proton exchange membrane 196 from the anode 194 to the cathode 198 while electrons are forced to pass the proton exchange membrane 196 in the same direction as the protons via the external circuit 200.

After reaching the cathode 198 side of the proton exchange membrane 196, protons and electrons interact with oxygen that has entered the PEM fuel cell 196 through the air inlet port 202 to form water. Water then exits the PEM fuel cell 196 through the water outlet port 204.

In the embodiments for application in a hydrogen fuel cell, liquid water exiting the water outlet port 204 of the PEM fuel cell 196 may be recycled, wherein it is redirected through a fluid conduit to the water inlet port 136 of the steam generator 118 and converted to water vapor that is later mixed with syngas in fluid conduit 102.

This design will serve to improve the overall efficiency of the system, allowing for more efficient use of the byproducts of the biomass. However, it should be understood that claimed subject matter need not redirect water through a fluid conduit to the steam generator, but may not use the water produced by the PEM fuel cell 196 whatsoever, or may use the water for other purposes.

While the embodiments just described generally include the use of a bubbling solution and/or suspension scrubber, it should be understood that claimed subject matter is not intended to be limited in scope to the particular design of the scrubber that is disclosed. But instead, the invention may integrate other forms of scrubbers such as a palladium or platinum membrane scrubber. Such scrubbers may or may not require stoppers and/or seals to maintain an airtight scrubber environment, may include more than one seal, and may rather include any scrubber design that results in the gas mixture received from the WGS being sufficiently scrubbed of unwanted carbon monoxide.

It should further be understood that, although several specific embodiments have just been described, claimed subject matter is not intended to be limited in scope to any particular embodiment or implementation. In the preceding description, various aspects of claimed subject matter may have been described. For purposes of explanation, specific numbers, systems, or configurations may have been set forth to provide a thorough understanding of claimed subject matter.

However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may not occur to those skilled in the art. It is, therefore, to be understood that the appended claims are intended to cover all such modifications or changes as fall within the true spirit of the claimed subject matter.

What is claimed is:

1. An ultra-pure hydrogen synthesis system which comprises:
   a gasifier;
   an oils and tars filtration system;
   a steam generator;
   a water gas shift reactor containing a catalyst, comprising oxides of copper, zinc and aluminum, that facilitates one or more chemical reactions between carbon monoxide and water in a temperature range of approximately 200° C. to approximately 250° C.;
   a heat-exchange two-phase water condenser and separator;
   a liquid-based, bubbling scrubber wherein a liquid contained within the scrubber includes
   a methanol suspension of copper (I) chloride particles;
   a hydrogen separator;
   one or more fluid conduits, wherein the one or more fluid conduits connect to and establish fluid communication between each of the gasifier, the oils and tars filtration system, the steam generator, the water gas shift reactor, the scrubber, and the hydrogen separator.

2. The ultra-pure hydrogen synthesis system of claim 1, wherein the gasifier is a down draft gasifier.

3. The ultra-pure hydrogen synthesis system of claim 1, wherein the catalyst of the water gas shift reactor comprises 32%-33% CuO, 34%-53% ZnO, and 15%-33% $Al_2O_3$ and is configured to minimize thermal sintering and occurrence of side reactions when operating at the temperature range of approximately 200° C. to approximately 250° C.

4. The ultra-pure hydrogen synthesis system of claim 1, further comprising a hydrogen fuel cell.

5. The ultra-pure hydrogen synthesis system of claim 1, wherein the hydrogen separator is an electrochemical separator.

6. The ultra-pure hydrogen synthesis system of claim 1, wherein the hydrogen separator is a swing absorption system.

7. The ultra-pure hydrogen synthesis system of claim 5, wherein the hydrogen separator is a proton exchange membrane based hydrogen purification system.

8. The ultra-pure hydrogen synthesis system of claim 1, wherein the-oils and tars filtration system is an activated carbon filter.

9. A method of producing ultra-pure hydrogen from biomass, comprising the steps of:
feeding a biomass feedstock into a gasifier and using the gasifier to perform gasification and pyrolysis of the biomass feedstock, which converts the biomass feedstock into a syngas product that includes molecules of nitrogen, carbon dioxide, carbon monoxide, and hydrogen;
outputting the syngas product from the gasifier into an oils and tars filtration system;
filtering any oils and tars from the syngas product using the oils and tars filtration system;
outputting the filtered syngas product from the oils and tars filtration system;
producing water vapor using a steam generator;
mixing the filtered syngas product with the water vapor produced by the steam generator to create a syngas-water vapor mixture;
feeding the syngas-water vapor mixture into a water gas shift reactor and using the water gas shift reactor to modify the syngas product to create a modified syngas product by increasing an amount of hydrogen gas and decreasing an amount of carbon monoxide, wherein the water gas shift reactor contains a catalyst comprising 32%-33% CuO, 34%-53% ZnO, and 15%-33% $Al_2O_3$, wherein the catalyst is configured to facilitate a chemical reaction between the carbon monoxide and water vapor and is also configured to minimize thermal sintering and occurrence of side reactions by operating at a temperature range of approximately 200° C. to approximately 250° C. to convert the syngas-water vapor mixture into a gas mixture that includes molecules of hydrogen and other byproduct gases including nitrogen, carbon dioxide, dihydrogen monoxide, and trace amounts of carbon monoxide;
outputting the modified syngas product from the water gas shift reactor;
feeding the modified syngas product through a fluid conduit and into a heat-exchange two-phase water separator, wherein the heat-exchange two-phase water separator is configured to:
condense water vapor from the modified syngas product into liquid water;
transmit the liquid water into the steam generator; and
transmit the modified syngas product through the fluid conduit and into a liquid-based bubbling scrubber wherein a liquid contained within the scrubber includes a methanol suspension of copper (I) chloride particles and the scrubber is configured to create a scrubbed gas by removing remaining trace amounts of carbon monoxide from the gas mixture;
outputting the scrubbed gas from the scrubber;
feeding the scrubbed gas into a hydrogen separator and using the hydrogen separator to isolate hydrogen gas molecules from remaining byproduct gases and create ultra-pure hydrogen gas; and
outputting the ultra-pure hydrogen gas from the hydrogen separator.

10. The method of producing ultra-pure hydrogen from biomass of claim 9, wherein the gasifier is a down draft gasifier.

11. The method of producing ultra-pure hydrogen from biomass of claim 9, wherein the ultra-pure hydrogen is output from the hydrogen separator into a hydrogen fuel cell.

12. The method of producing ultra-pure hydrogen from biomass of claim 9 wherein the hydrogen separator is an electrochemical separator.

13. The method of producing ultra-pure hydrogen from biomass of claim 9, wherein the hydrogen separator is a swing absorption system.

14. The method of producing ultra-pure hydrogen from biomass of claim 9, wherein the oils and tars filtration system is an activated carbon filter.

15. The method of producing ultra-pure hydrogen from biomass of claim 9, wherein a ratio of water vapor to syngas is a 5:1 ratio.

* * * * *